United States Patent [19]
Kumar et al.

[11] Patent Number: 5,116,508
[45] Date of Patent: May 26, 1992

[54] SUPERCRITICAL FLUID EXTRACTION FROM LIQUIDS

[75] Inventors: M. Lalith Kumar, Pittsburgh, Pa.; Joseph L. Hedrick, Blacksburg, Va.

[73] Assignee: Suprex Corp., Pittsburgh, Pa.

[21] Appl. No.: 483,870

[22] Filed: Feb. 23, 1990

[51] Int. Cl.$^5$ .............................. B01D 11/04
[52] U.S. Cl. .................. 210/639; 210/634; 210/656; 210/198.2
[58] Field of Search ............... 210/634, 639, 656, 774, 210/805, 806, 198.2, 259, 294, 511, 194, 195.1

[56] References Cited

U.S. PATENT DOCUMENTS

| | | | |
|---|---|---|---|
| 4,597,943 | 7/1986 | Sugiyama et al. | 210/198.2 |
| 4,683,063 | 7/1987 | Rice | 210/634 |
| 4,770,780 | 9/1988 | Moses | 210/634 |

FOREIGN PATENT DOCUMENTS 54-47866  4/1979  Japan .................. 210/639

Primary Examiner—Peter Hruskoci
Attorney, Agent, or Firm—Reed Smith Shaw & McClay

[57] ABSTRACT

A method and apparatus are disclosed for the supercritical extraction of a sample from a liquid medium. The method and apparatus provide for the recirculation of the supercritical fluid containing the sample through the liquid containing sample until at least a portion of the sample has been extracted.

23 Claims, 4 Drawing Sheets

COMPARISON OF SPECTRA FOR ACTUAL DIMP AND THE MAJOR PEAK FROM SFE SFC OF AQUEOUS SOLUTION (DIMPEX).

SUPERCRITICAL FLUID EXTRACTION FROM LIQUIDS

FIELD OF THE INVENTION

The present invention relates to method of supercritical fluid extraction and chromatography, and, in particular, to a method for the extraction of analytes from liquid media.

BACKGROUND OF THE INVENTION

The use of supercritical fluid extraction techniques and supercritical fluid chromatography are well known. See, e.g., U.S. Pat. Nos. 4,814,089 and 4,871,453. See generally, Glob Modern Practice of Gas Chromatography, 2d ed., John Wiley & Sons 1985 and Novotry et al. Temperature and Pressure Effects in Supercritical Fluid Chromatography, Journal of Chromatographic Science Jun. 1971.

Supercritical fluid extraction permits the extraction of materials which are difficult to separate. Typically it is used in the extraction of complex, high molecular weight mixtures including polymers. This method utilizes a mobile phase of a highly compressed gas, such as $CO_2$, at or above its critical temperature and pressure. The physical properties of these gases are between those of gases and liquids which results in a good transport of the analyte.

It is known that the effectiveness of the supercritical fluid extraction is the ability to change the density of the mobile phase which effects solvation, diffusion and viscosity of the fluid.

Notwithstanding the versatility of supercritical fluid extraction, it is very difficult to extract analytes from liquid media such as an aqueous media. See, Thiebaut, D., et al., *Journal of Chromatography*, "Supercritical-Fluid Extraction of Aqueous Samples And On-Line Coupling To Supercritical-Fluid Chromatography," 477 (1989) 151-159. Using $CO_2$ as the fluid, up to 0.3% of the water from the aqueous solution is dissolved in the fluid. As the fluid is passed over the sample, water is continuously entrained and the extracted sample results in a two phase system. For this reason, dynamic extractions have not provided the desired result because the sample along with the media is moved from one container to another. Static extractions where the vessel is pressurized for a period of time are inefficient and slow.

Other solutions to this problem have been sought, however, they have only been successful in large scale systems such as in waste water treatment. See, e.g., (1) Kuk, M.S.; Montagna, J.C., *Chemical Engineering at Supercritical Fluid Conditions;* Paulitis, M.E., Penninger, J.D., Gray R.D., Davison, K.P. Eds.; Ann Arbor Science; Ann Arbor, Mich., 1983; pp. 101-111; (2) Ehntholt, D.J.; Thrun, K.; Eppig, C.; Ringhand, P.J., *Envivon. Anal. Chem.* 1983, 13, 219-235; (3) Eckert, C.A.; Van Alstein, J.G.; Stoicos, T., *Environ. Sci. Technol.* 1986, 20, 319-325; and (4) Roop, R.K.; Akgerman A.; Irvin, T.R.; Steens, E.K.J., *Supercrit. Fluid* 1988, 1, 31-36.

Accordingly, an object of the present invention is to provide a method and means for the supercritical fluid extraction of samples in an aqueous media.

SUMMARY OF THE INVENTION

Generally, the present invention provides a means and method for extracting a sample from a liquid media using a supercritical fluid. The method of the present invention includes introducing a supercritical fluid into the liquid containing sample, extracting the fluid and reintroducing the extracted fluid back into the liquid containing sample. Preferably the recirculation of the supercritical fluid continues until a substantial quantity of sample is extracted. Typically, this can take from 5 to 30 minutes.

In the present invention the temperature of the fluid is maintained near its critical point. As used herein, "near" means up to 100° C. above the critical point of the fluid. For example, for $CO_2$ the critical point temperature is 31.3° C. so that the range is from 31.3° C. to 131.3° C. For toluene, the critical temperature is 196.6°, so that the range is 196.6 to 296.6°C.

In another embodiment of the invention the supercritical fluid can be modified with another fluid. Generally, it is not desirable to modify the supercritical fluid by adding more than about 30% of the modifying chemical. In general, any compound which can dissolve in the selected supercritical fluid can be used as a modifying agent. In a present preferred embodiment, for example, the supercritical fluid is carbon dioxide and the modifying chemical is methanol or ethanol, although any aliphatic alcohols can be used depending upon desired properties.

Other supercritical fluids can be used, including toluene, ammonia, freon, nitric oxide, sulfur fluoride, sulfur dioxide, helium and xenon. Table I sets forth the critical points for these selected fluids.

TABLE I

| SUPERCRITICAL FLUID MOBILE PHASES | | |
|---|---|---|
| | $P_c$(atm) | $T_c$(°C.) |
| $CO_2$ | 73.8 | 31.1 |
| $C_5H_{12}$ | 33.3 | 196.6 |
| $SF_6$ | 37.1 | 45.6 |
| $N_2O$ | 72.5 | 36.4 |
| $CClF_3$ | 38.2 | 28.9 |
| $SO_2$ | 78.0 | 158.0 |
| $NH_3$ | 114.8 | 132.4 |
| Xe | 58.0 | 17.0 |
| He | 2.3 | −268.0 |

In another embodiment of the invention it has been found that the extraction time can be greatly reduced by adding a compound such as a salt to the liquid containing sample. A salt such as sodium chloride is preferable in solutions which are neutral; however, basic salts provide advantages in extraction from basic liquids and acid salts in extraction from acidic solutions.

In a preferred apparatus, a supercritical fluid extraction system is used, but modified to provide means for isolating the extraction system and for recirculating the supercritical fluid through the extraction system. In general, valve means and an extraction vessel having a fluid inlet and outlet are provided. The extraction vessel is coupled to the supercritical fluid extraction system through the valves so that it can be isolated in series with a recirculating pump. The recirculating pump recirculates the supercritical fluid an appropriate length of time and is sampled analyzed via a sample loop in the supercritical fluid chromatographic column.

The invention provides a means and method for analyzing analytes which are soluble in the supercritical state where those analytes are dissolved in an aqueous solution. Other advantages of the present invention will become apparent from a perusal of the following de-

PRESENTLY PREFERRED EMBODIMENTS

Figure 1:
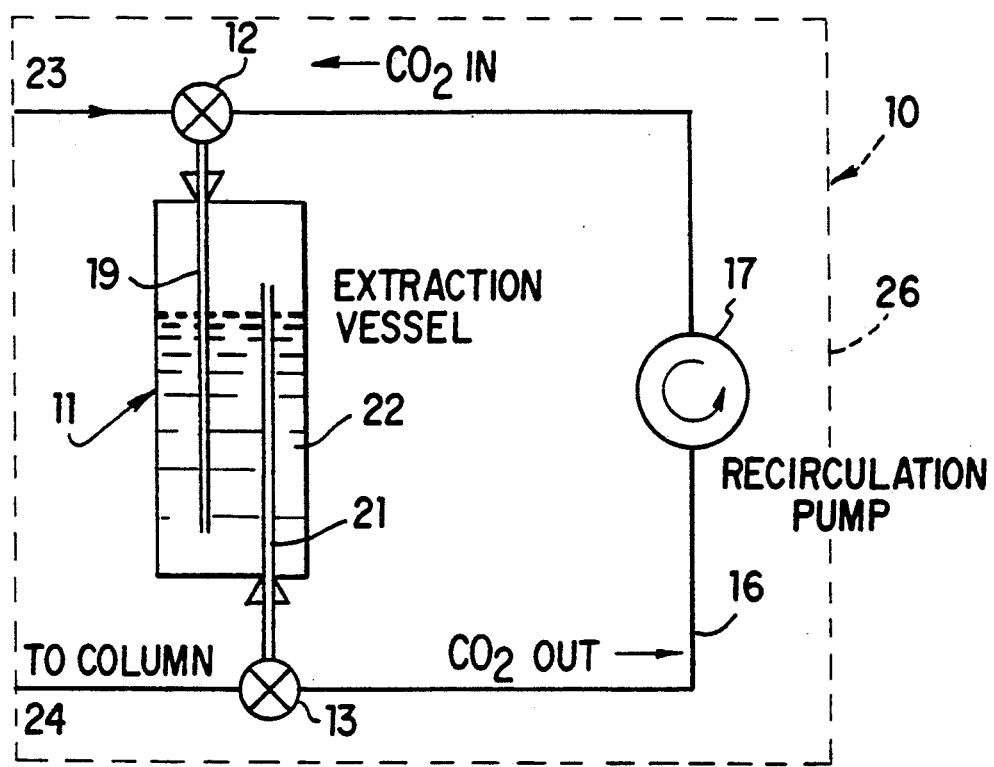
FIG. 1 is a schematic diagram of the apparatus of the present invention.

Referring to FIG. 1, the extraction system 10 of the present invention is similar to current state of the supercritical extraction systems such as an SFE/50 manufactured and sold by the Suprex Corporation of Pittsburgh, Pa. In extraction system 10, however, an extraction vessel 11 is connected via multiport valves 12 and 13 to a feedback or recirculation loop 16. A recirculation pump 17 is positioned in loop 16 to recirculate the supercritical fluid through vessel 11.

Extraction vessel 11 includes supercritical fluid inlet means 19 and outlet means 21. Inlet means 19 is submerged in liquid containing sample 22 so that the supercritical fluid can make intimate contact with the sample 22. Since the fluid is less dense than the liquid and sample, it rises through samples 22 and into the top of vessel 11. Outlet means 21 collects the fluid and exhausts it out of the vessel for recirculation or analysis. As shown diagrammatically, outlet means 21 exits vessel 11 through the bottom, however, it can also exit through the top of vessel 11.

Valves 12 and 13 can be set to permit extraction vessel 11 and loop 16 to be pressurized with supercritical fluid such as $CO_2$. Pressure is maintained between 25 and 750 atmospheres, and preferably between 100 and 500 atmospheres. After pressurization, valves 12 and 13 can be set to isolate vessel 11 and loop 16 from lines 23 and 24 for recirculation of the fluid through sample 22. Preferably, recirculation is carried on for 5 to 30 minutes or longer if necessary.

Because the extraction temperature is maintained between 10° and 250° C., depending upon the fluid used for extraction, extraction system 10 is maintained in controlled environment 26, such as an oven. Controlled environment 26 preferably is capable of maintaining the temperature between 7° C. and 400° C. above ambient temperature. For purposes of the present invention the desired temperatures are between 30° and 200° and preferably between 50° and 150° C.

Supercritical fluid enters extraction vessel 11 through line 23 via valve 12. The fluid with extract is recirculated for an appropriate period of time to remove the sample from liquid, normally water. It is then charged through line 24 to inlet port of a gas chromatograph or accumulated in a precolumn for supercritical fluid chromatography, gas or liquid chromatography.

The extraction system 10 of the present invention can readily be incorporated into a present state of the art supercritical fluid chromatograph such as a model SFC/200A manufactured by Suprex Corporation.

The preferred fluids for use in the present invention include $CO_2$ and $CO_2$+Modifier, where the modifier is present in an amount from 0.1% to 30% by volume. The modifying agent can be any compound that dissolves in the selected fluid. Table II identifies a number of compounds that have been extracted from aqueous solutions according to the present invention.

TABLE II

| COMPOUND | PRESSURE | TEMPERATURE |
| --- | --- | --- |
| Phenol | 100–350 atm | 50–100° C. |
| Caffeine | 450 atm | 50° C. |
| Dimethyl Methane Phosphonate | 350 atm | 50° C. |
| Diisopropyl Methane Phosphonate | 350 atm | 50° C. |
| Sulfamethoxazole | 450 atm | 50° C. |
| Sulfamethazine | 450 atm | 50° C. |
| Trimethoprim | 450 atm | 50° C. |
| Triprolidine | 450 atm | 50° C. |
| Pseudoephradine.HCl | 450 atm | 50° C. |
| Soy Bean Oil | 350 atm | 50° C. |
| Methanol | 350 atm | 50° C. |
| Ethanol | 350 atm | 50° C. |
| Propylene Glycol | 350 atm | 50° C. |
| Benzyl Alcohol | 350 atm | 50° C. |

To shorten the extraction time or number of recirculations, it has been found to be highly advantageous to add a compound to sample 22. The compound may be an organic or inorganic material. Inorganic salts have been found to be particularly useful in shortening the time of extraction. For example, NaOH and HCl are added for samples which are protonable bases and protonable acids, respectively. If the sample is a neutral species, then NaCl is preferred. In many cases, significant reductions have been achieved, e.g., from an hour and a half to five minutes.

EXPERIMENTAL

The following extraction was carried out using an extraction vessel 11 from Suprex Corporation which was 1 cm i.d.×10 cm in length (8 mL volume). The supercritical fluid was $CO_2$ and the subsequent chromatography was done with a Suprex SFC 200 (Suprex Corporation, Pittsburgh, Pa.). The extraction system 10 shown in FIG. 1 in the recirculation mode consisted of multiport valves 12 and 13, respectively, (Rheodyne, Inc., Cotati, Calif.), a recirculating pump 17 (Micropump, Inc., Concord, Calif.), extraction vessel 11, and associated plumbing in a temperature-controlled oven 26. A 1-m length of 100 μm deactivated fused silica was used to interface the extraction apparatus to either a 1.0 mm or 4.6 mm (i.d.)×250 mm DELTABOND cyanopropyl packed column (Keystone Scientific, Inc., Bellefonte, Pa.). The results were obtained with a 20- μL sample loop. The volume of extracted phase was determined to be 6 mL when using 3-mL aqueous samples. Each 20- μL injection represents 0.3% of the total extracted phase, so that multiple injections for extraction profiling can be run on a sample without significantly depleting the extracted phase of analyte. Fourier transform infrared (FT-IR) data were acquired from a Nicolet (Madison, Wis.) supercritical fluid chromatography/infrared (SFC/IR) interface.

Figure 2:
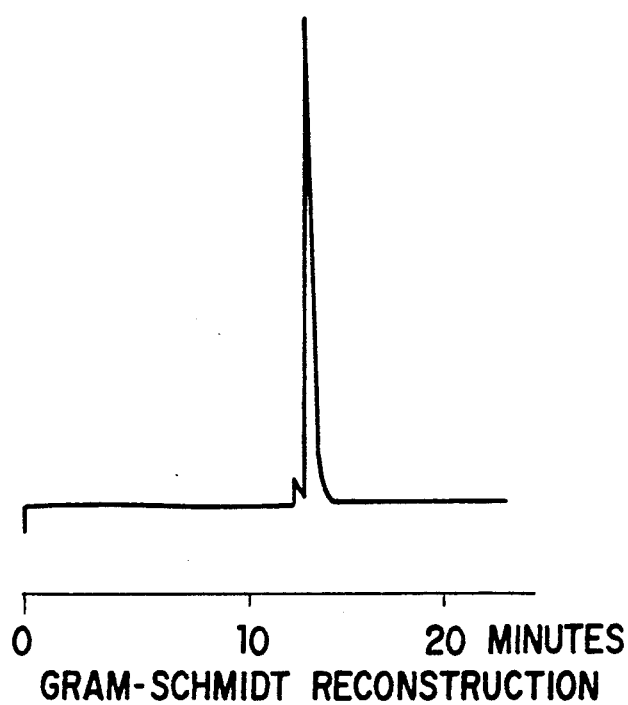
FIG. 2 is a comparison of GSR and FID traces.
Figure 2:
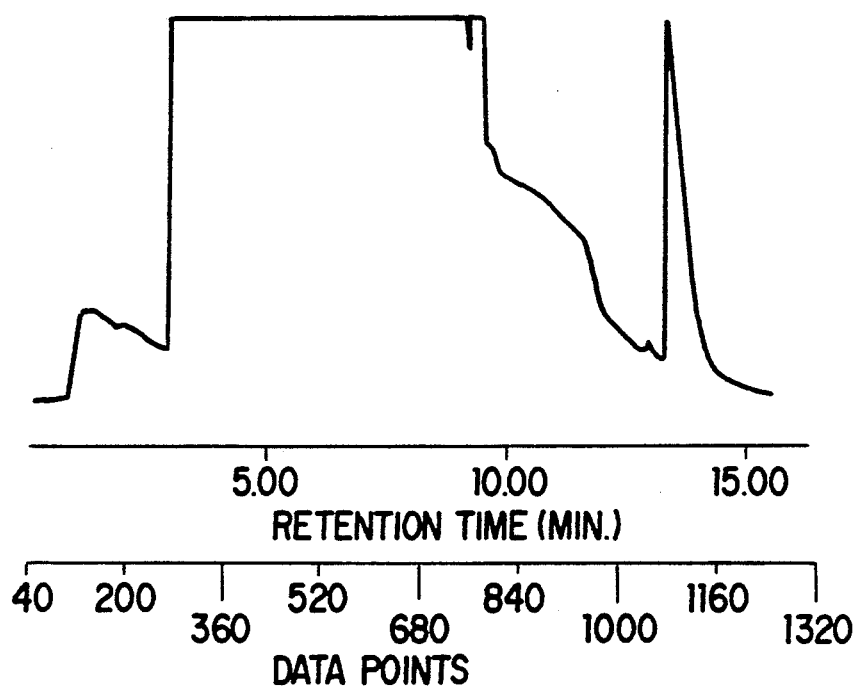
Figure 3:
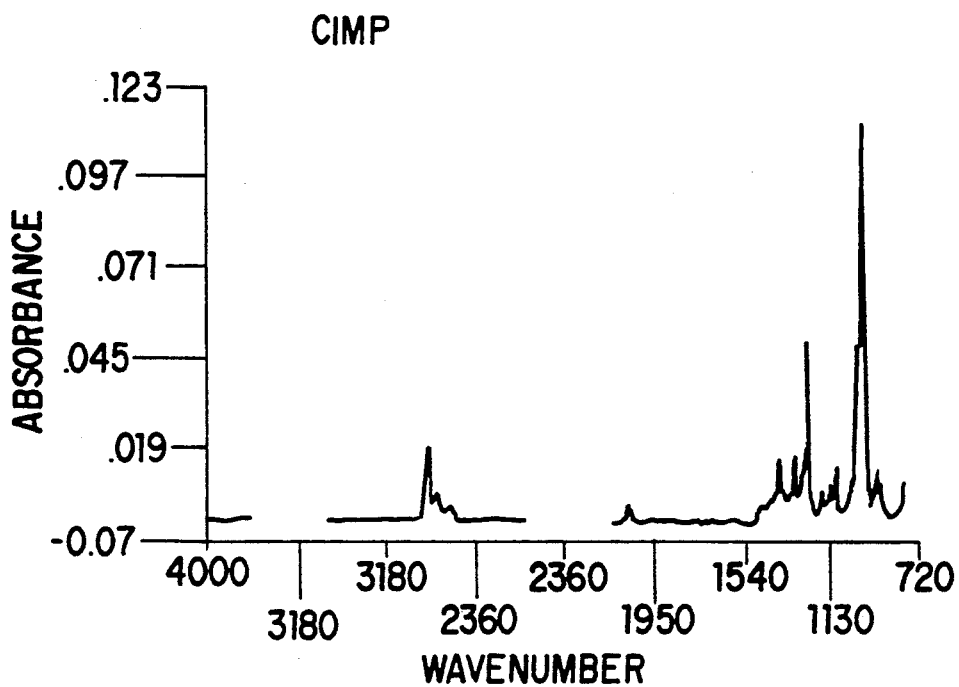
FIG. 3 is a comparison spectra for DIMP from an SFE/SFL extraction from an aqueous solution.
Figure 3:
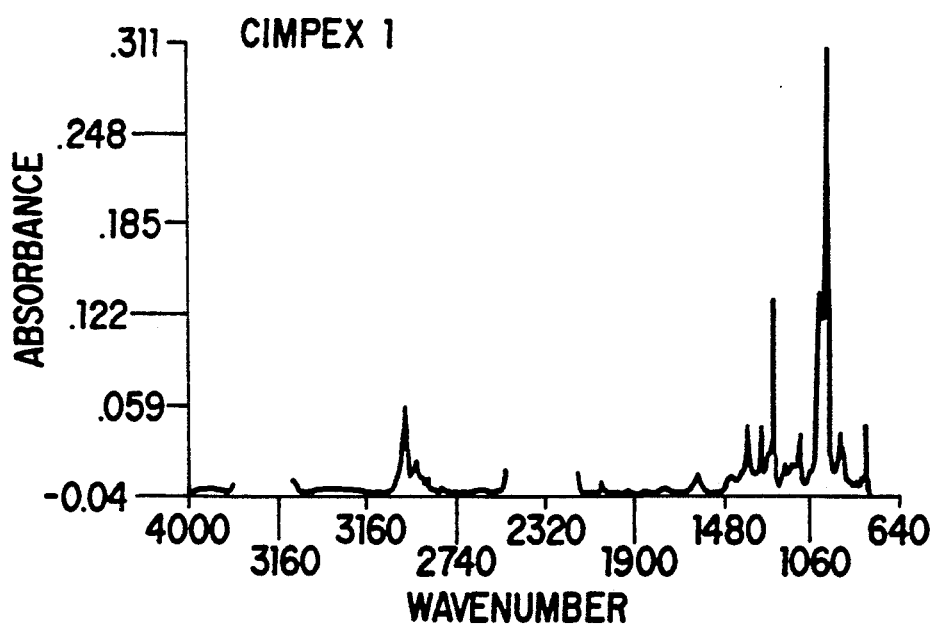

FIG. 2 shows a comparison of the flame ionization and Gram-Schmidt reconstruction (GSR) (i.e., essentially total infrared absorbance) traces of a supercritical fluid extraction/supercritical fluid chromatography (SFE/SFC) run of 834 ppm diisopropyl methylphosphonate (DIMP) in water-using DELTABOND CN column (25 cm) at 100 atm for 10 min ramped to 350 atm in 10 min. The column temperature was 75° C. Extraction was done at 350 atm for 1 hour. FT-IR detection was used to provide positive identification of the eluting peak as DIMP. The large peak at the beginning of the GSR is due to a relatively small amount of water (carried over with the phosphonate during the extraction) being injected onto the column. The relatively long hold time in the chromatographic pressure program was used to allow the water to completely elute from the column prior to the phosphonate. FIG. 3 compares the spectrum of the major eluting peak from SFE/SFC with the spectra of DIMP taken from a standard. At all frequencies the spectra match.

Figure 4:
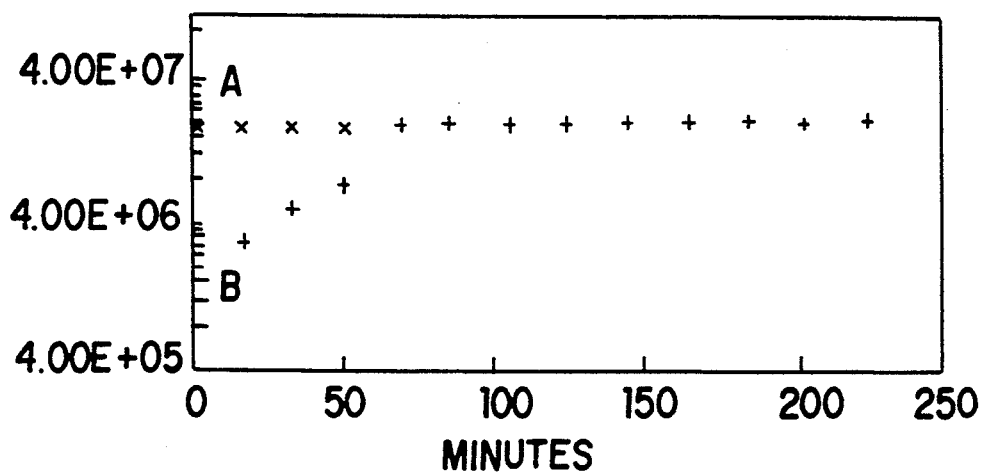
FIG. 4 is a comparison of the amount of DIMP extracted against time.

In order to be a useful extraction technique, the method should be relatively fast (e.g., less than 30 min). A time study was done to determine the rate of extraction of DIMP from the water. The results are shown in FIG. 4. As expected, there is an initial equilibration time where there was a slow increase in the amount extracted with time. After 1.5 hour the system reached equilibrium and there was no change in the SFC/FID area response. However, when 0.1 mg of NaCl was added to the sample before extraction, the equilibration time was reduced to less than 5 min as shown in FIG. 4.

A calibration cure was made to determine the viability of the static extraction method as a quantitative technique. The FID response for four concentrations of DIMP in $H_2O$ was measured. The total analysis time for each concentration was less than 45 min. This time included cleaning and loading of the extraction system, pressurization, extraction of the sample as well as five replicate injections, and SFC analysis of each aliquot. The calibration curve is linear over the range measured (834 ppb to 834 ppm). The relative standard deviation for peak area is less than 1.5% for concentrations greater than 8.34 ppm and 15% for concentrations greater than 3.34 ppm and 15% for 834 ppb DIMP.

Figure 5:
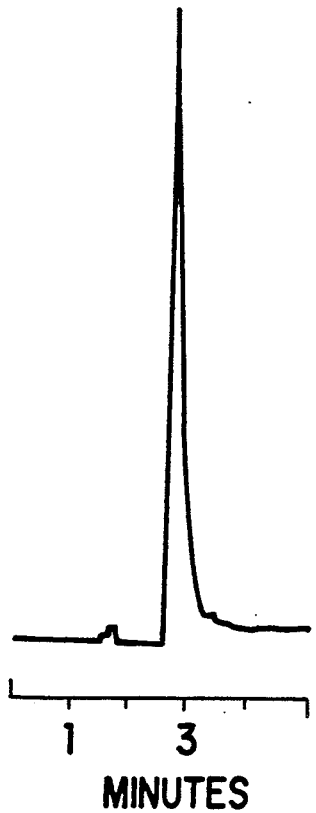
FIG. 5 is spectra of extracted triprolidine from an aqueous solution.

The technique has also been extended for the qualitative study of various hydrochloride salts of drugs. FIG. 5 shows the results of triprolidine hydrochloride analyzed by SFE/SFC. FIG. 5 is a SFE/SFC/UV of 1 mg/mL aqueous solution of triprolidine. Extraction was done at 50° C., 100% $CO_2$, 340 bar; chromatography, DELTABOND CN, 60° C., 290 nm, 2 mL/min $CO_2$ and 150 μL/min MeOH/TBAH for 1.0 min then 150 to 450 μL/min in 3.0 min and hold. An aqueous solution of the drug was added to 1 mL of tetrabutylammonium hydroxide (TBAH) in the extraction vessel. In the extraction vessel the free triprolidine base was formed and subsequently extracted. Chromatographic separation of the free base from the residual water was then accomplished by eluting with a gradient of $CO_2$ and methanol-containing TBAH.

While presently preferred embodiments of the invention have been shown and described in particularity, the invention may be otherwise embodied within the scope of the appended claims.

What is claimed is:

1. In a method for the supercritical fluid extraction of a sample from a liquid containing sample, wherein the supercritical fluid and sample form a system having an equilibration time, the improvement of extracting a sample from the liquid containing sample comprising the steps of
    adding a compound capable of reducing said equilibration time of said system to the liquid containing sample;
    introducing said supercritical fluid into said liquid containing sample to dissolve said sample; and
    circulating through said liquid containing sample, the supercritical fluid containing substantially all the dissolved sample a plurality of times to increase extraction recovery.

2. In the improvement set forth in claim 1, the additional step of analyzing the extracted sample to determine its composition.

3. In the improvement set forth in claim 1 or 2, wherein the liquid is water and the supercritical fluid is carbon dioxide.

4. In the improvement set forth in claim 1, wherein said compound is a salt.

5. In the improvement set forth in claim 1, wherein said compound is a pH neutral compound when said sample is pH neutral.

6. In the improvement set forth in claim 1, wherein said compound is a basic compound when said sample is basic.

7. In the improvement set forth in claim 1, wherein said compound is an acidic compound when said sample is acidic.

8. A method for the supercritical fluid extraction of a sample from liquid containing a sample, wherein the supercritical fluid and sample form a system having an equilibration time, comprising the following steps:
    (A) adding a compound capable of reducing said equilibration time of said system to said liquid;
    (B) pressurizing an extraction vessel containing said liquid containing sample with a supercritical fluid;
    (C) introducing said supercritical fluid into said liquid and removing said fluid with dissolved sample from said vessel; and
    (D) reintroducing said fluid with dissolved sample into said liquid within said vessel a plurality of times, thereby increasing extraction recovery.

9. A method as set forth in claim 8 wherein said supercritical fluid is selected from the group consisting of $CO_2$, SF, $N_2O$, $C_5H_{12}$, $CClF_3$, $SO_2$, Xe and He.

10. A method as set forth in claim 9, wherein said supercritical fluid contains up to 30% of a modifier fluid capable of dissolving the sample.

11. A method as set forth in claim 8, 9, or 10, wherein said liquid is water.

12. A method as set forth in claims 8, 9 or 10, wherein said vessel is maintained at pressure of from 25 to 750 atmospheres and a temperature of 10° to 250° C.

13. A method as set forth in claim 8, 9, or 10, wherein said compound is selected from the group of basic, neutral and acidic compounds, and further wherein said compound is selected to be a basic compound when said sample is basic, said compound is selected to be a neutral compound when said sample is neutral and said compound is selected to be an acidic compound when said sample is acidic.

14. A method for the supercritical fluid extraction of a sample from a liquid containing a sample comprising the steps of adding to the liquid before introducing a supercritical fluid to the liquid a compound capable of reducing extraction time, wherein said compound is a basic compound when said sample is basic, said compound is a neutral compound when said sample is neutral and said compound is an acidic compound when said sample is acidic, and introducing said supercritical fluid into said liquid containing sample to dissolve said sample.

15. A method as set forth in claim 14, wherein said neutral compound is a salt.

16. A method as set forth in claim 15, wherein said salt is NaCl.

17. A method as set forth in claim 14, wherein said basic compound is a basic salt.

18. A method as set forth in claim 17, wherein said basic salt is NaOH.

19. A method as set forth in claim 14, wherein said acidic compound is HCl.

20. A method as set forth in claim 14, wherein the liquid is water.

21. A method as set forth in claim 20 wherein said supercritical fluid is carbon dioxide.

22. A method as set forth in claim 14 wherein said supercritical fluid is selected from the group consisting of $CO_2$, SF, $N_2O$, $C_5H_{12}$, $CClF_3$, $SO_2$, $HN_3$, Xe and He.

23. A method as set forth in claim 14, wherein said supercritical fluid contains up to 30% of a modifier fluid.

* * * * *